Nov. 27, 1923.                                               1,475,353
S. SHAPIRO ET AL
TOOL FOR REPAIRING PUNCTURED TIRES
Filed Feb. 20, 1922
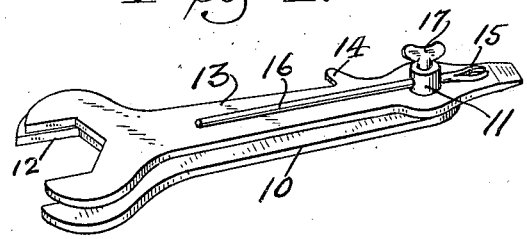
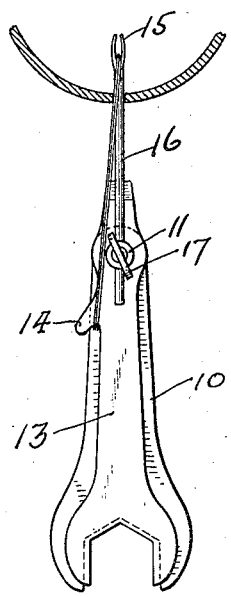
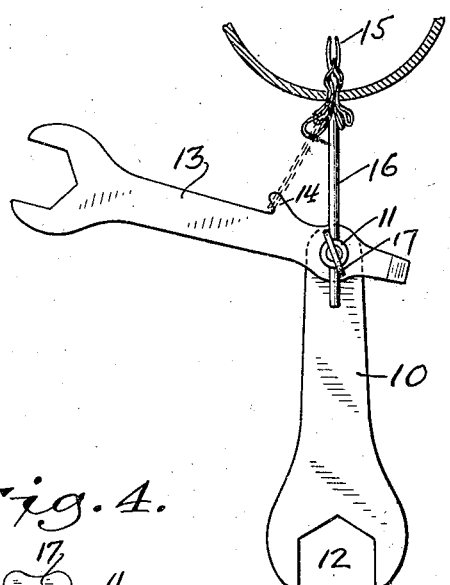
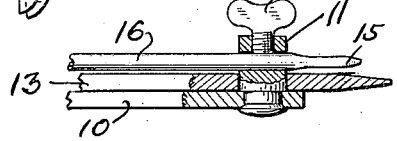
Witness:
Fred Palm
Del.
INVENTOR.
Samuel Shapiro,
BY and Max Weinberg.
Erwin, Wheeler & Woolard
ATTORNEYS.

Patented Nov. 27, 1923.

1,475,353

UNITED STATES PATENT OFFICE.

SAMUEL SHAPIRO AND MAX WEINBERG, OF MILWAUKEE, WISCONSIN.

TOOL FOR REPAIRING PUNCTURED TIRES.

Application filed February 20, 1922. Serial No. 537,905.

*To all whom it may concern:*

Be it known that we, SAMUEL SHAPIRO and MAX WEINBERG, both citizens of the United States, and residents of the city of Milwaukee, county of Milwaukee, and State of Wisconsin, have jointly invented a new and useful Improvement in Tools for Repairing Punctured Tires; and we do declare the following to be a clear, exact, and complete description thereof, such as will enable persons skilled in the art to which the invention pertains to make and use the same, reference being had to the accompanying drawing for an exposition of the constructional features of our improved device.

Our invention is embodied in a conveniently constructed device for repairing punctures in bicycle or other tires, and is of such compact arrangement that it may be carried in the pocket of the rider, so as to be immediately accessible when occasion for its use arises.

The invention is constructed with provisions which enable the needle to be retracted so as to be better protected against damage, when not in use.

Other features residing in the invention will be pointed out in the claims appended to this specification.

In the accompanying drawing:

Figure 1 is a perspective view of the invention, in its compacted form.

Fig. 2 is a view showing the manner of its use in inserting a rubber band in a tire to close a puncture therein.

Fig. 3 is a similar view showing the device as having operated to release the tension of the rubber band, to permit contraction and expansion of the latter to close the puncture.

Fig. 4 is a vertical sectional view through the forward end of the device, and showing the manner of connecting the parts, and also the means for enabling the needle to be retracted to inoperative position, for the protection of the needle, when not in use.

In the drawing, the numeral 10 indicates the handle, in the forward end of which a post 11 is fixed. The rear end of the handle may be formed with a wrench 12, for use in connection with the cones of the rear wheel of the bicycle.

A lever 13, perforated transversely at its forward end, is pivoted upon the post 11, and may likewise be formed at its other end with a cone wrench for the front wheel of the bicycle.

The lever 13 is a tension lever for distending the rubber band, and is provided with a laterally extending hook 14, over which the rubber band stretched from the needle 15 may be passed, so as to present the rubber band in a state of tension for insertion in the puncture.

The needle 15 is conveniently forked at its forward end, and its shank 16 is received in a transverse perforation in the fixed post 11, above the plane of the pivoted lever 13, so as to retain the lever in operative position as a part of the structure. A screw 17, threaded into the end of the post serves the purpose of clamping and retaining the needle in any of the positions to which it may be adjusted. By means of the clamping screw 17, the needle may be advanced so as to present its point in position for operation, or it may be retracted so that the point will lie adjacent the lever 13, and be protected from injury while not in use.

In operation, the lever 13 is brought into parallelism with the handle 10, and a rubber band is placed in the forked end of the needle and stretched around the hook 14, as usual in devices of this class. Cement is placed in the puncture after which the point of the needle is inserted. The lever 13 is turned on its pivot upon the post 11, to free the band from the hook. The latter, being free from its tension, expands and fills the opening in the tire, as the needle is withdrawn.

The end of the lever adjacent the pivot, may be formed as a screw-driver, or other tool, if desired.

Having thus described our invention, what we claim and desire to secure by Letters Patent of the United States, is:

1. In a puncture repairing tool, a handle a fixed post extending laterally thereof, a lever pivoted on the said post and provided with a hook, and a needle adjustably secured in the post, the said lever being adapted to be turned to discharge the rubber band distended between the point of the needle and the hook.

2. In a puncture repairing device, a handle having a fixed post therein, a needle secured in the post, and a lever provided with a rubber band retaining hook pivoted on the post between the handle and the needle, the lever being adapted to be turned on its pivot to discharge the rubber band distended between the point of the needle and the hook.

3. In a puncture repairing device, a handle having a fixed post at one end, a lever pivoted at one end on the post and provided with a hook intermediate its ends, a needle adjustably secured transversely of the post, and acting to hold the lever in position, the said lever being adapted to be turned to discharge the elastic band distended between the point of the needle and the hook.

In testimony whereof, we have signed our names at Milwaukee, this 16th day of February, 1922.

SAM SHAPIRO.
MAX WEINBERG.

Witnesses:
W. F. WOOLARD,
O. C. WEBER.